(12) United States Patent
Takayama

(10) Patent No.: US 6,519,070 B2
(45) Date of Patent: Feb. 11, 2003

(54) OPTICAL SCANNING APPARATUS, MULTI-BEAM OPTICAL SCANNING APPARATUS, AND IMAGE FORMING APPARATUS USING THE SAME

(75) Inventor: Hidemi Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/742,125

(22) Filed: Dec. 22, 2000

(65) Prior Publication Data

US 2001/0022679 A1 Sep. 20, 2001

(30) Foreign Application Priority Data

Dec. 27, 1999 (JP) .......................................... 11-370159

(51) Int. Cl.$^7$ .............................................. G02B 26/08
(52) U.S. Cl. ...................... 359/205; 359/204; 359/205; 359/212; 359/216; 347/235; 347/250; 347/243; 347/244; 347/258; 347/261
(58) Field of Search ................................. 359/196, 212, 359/216–219, 205, 206; 347/233, 235, 243–244, 250, 258–261; 250/234–236

(56) References Cited

U.S. PATENT DOCUMENTS 6,239,894 B1 * 5/2001 Ishibe ........................ 359/205

OTHER PUBLICATIONS

U.S. application No. 09/349,111, filed Jul. 8, 1999.
U.S. application No. 09/705,724, filed Nov. 6, 2000.

* cited by examiner

Primary Examiner—James Phan
(74) Attorney, Agent, or Firm—Fitzpatrick, Cella, Harper & Scinto

(57) ABSTRACT

An optical scanning apparatus has an incident optical system for causing a light beam from a light source to be obliquely incident in a sub-scanning cross-section on a deflecting surface of an optical deflector, and an imaging optical system for forming, on a scanned surface, an image of the light beam deflected by the deflecting surface. Letting K be the recording density in a main scanning direction on the scanned surface, $\gamma$ be the absolute value of a maximum difference in a tilt angle between the deflecting surfaces in the sub-scanning cross-section, $\alpha$ be the incident angle of the light beam incident on the deflecting surface in the sub-scanning cross-section, $\theta$ be the scanning angle of an most off-axis light beam with respect to the optical axis of the imaging optical system in a main scanning cross-section, f be the focal length of the imaging optical system, and $\phi$ be the angle a scanning central axis makes with an optical axis when the optical axis of the incident optical system opposing the deflecting surface is projected to the main scanning cross-section, a predetermined condition is satisfied.

25 Claims, 11 Drawing Sheets

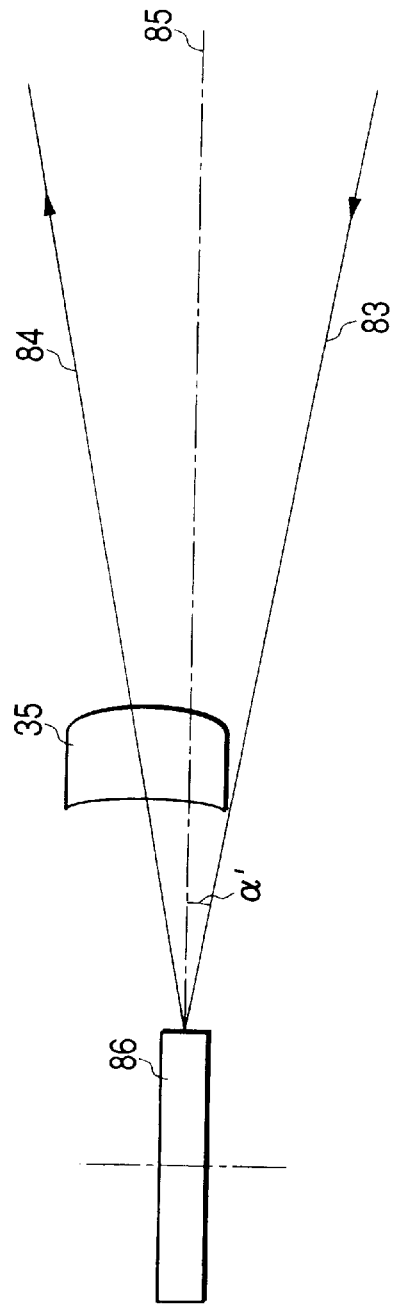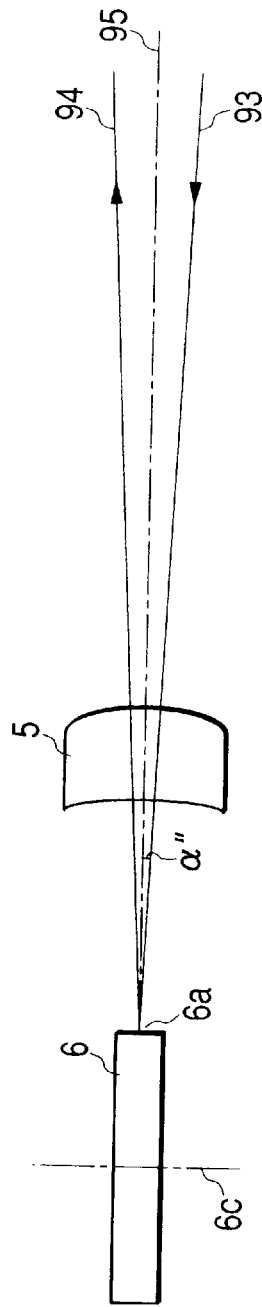

OPTICAL SCANNING APPARATUS, MULTI-BEAM OPTICAL SCANNING APPARATUS, AND IMAGE FORMING APPARATUS USING THE SAME

BACKGROUND OF THE INVENTION

1. Field of the Invention

The present invention relates to an optical scanning apparatus, a multi-beam optical scanning apparatus, and an image forming apparatus using the same and, more particularly, to an apparatus suitable for an image forming apparatus such as a laser beam printer or digital copying machine, which can obtain a satisfactory image on a scanned surface (photosensitive surface) by appropriately setting the elements such that the amount of jitter that occurs in the main scanning direction due to a tilt of a deflecting surface of an optical deflector falls within an allowable range.

2. Related Background Art

In an optical scanning apparatus conventionally used for an image forming apparatus such as a laser beam printer or digital copying machine, a light beam emitted from a light source means and optically modulated in accordance with an image signal is periodically deflected by an optical deflector formed by, e.g., a rotary polyhedral mirror (polygon mirror), and focused to a spot on the photosensitive recording medium (photosensitive drum) surface through an imaging optical system having f-θ characteristics, and the surface is optically scanned to record an image.

FIG. 20 is a schematic view showing the main part of a conventional optical scanning apparatus.

Referring to FIG. 20, an almost parallel light beam emitted from a laser unit 201 is incident on a cylindrical lens 202 having a predetermined refracting power only in the sub-scanning direction. Of the almost parallel light beam incident on the cylindrical lens 202, a light component in a main scanning section emerges without any change. In a sub-scanning cross-section, the light beam converges and forms an almost linear image on a deflecting surface 203a of an optical deflector 203 made of a rotary polyhedral mirror. The light beam reflected/deflected by the deflecting surface 203a of the optical deflector 203 is focused onto a photosensitive drum 206 serving as a scanned surface through an imaging optical system (f-θ lens system) 207 having f-θ characteristics, and the optical deflector 203 is rotated in the direction indicated by an arrow A to optically scan the photosensitive drum 206 in the direction indicated by an arrow B (main scanning direction), thereby recording image information.

In recent years, along with size reduction of a printer and the like, an optical scanning apparatus is also required to be compact and have high performance. To meet this requirement, various optical scanning apparatuses have been proposed for which size reduction of the entire apparatus is achieved by bending the optical path using, e.g., a return mirror. Accordingly, sometimes the incident optical system may have to be inclined with respect to a plane perpendicular to the rotational axis of the optical deflector (this system will also be referred to as an oblique incident optical system hereinafter).

In an optical scanning apparatus using such an oblique incident optical system, for example, the light beam incident position on the scanned surface shifts in the main scanning direction due to a tilt of the deflecting surface of the optical deflector, resulting in a shift in drawing position in the main scanning direction, i.e., so-called jitter.

In a recent image forming apparatus having high resolution of 1,200 dpi or more, a jitter amount in the main scanning direction conspicuously appears as degradation in image quality, and the allowable range for the jitter amount in the main scanning direction is narrowing.

A problem posed here is a variation in tilt angle between the plurality of deflecting surfaces.

If the tilt angle varies between the plurality of deflecting surfaces, the drawing position expands/contracts to both sides of the optical axis. For this reason, even when BD detection can be done at the center to minimize the jitter at the center, the drawing position does shift by the above amount.

This will be described in detail. If the tilt angles of adjacent deflecting surfaces are different, the length of a scanning line formed by a light beam reflected/deflected by one deflecting surface is different from that of a scanning line formed by a light beam reflected/deflected by the other deflecting surface. That is, the magnification changes in the main scanning direction.

SUMMARY OF THE INVENTION

It is an object of the present invention to provide an optical scanning apparatus using an oblique incident optical system, which can obtain a satisfactory image by appropriately setting the elements such that the amount of jitter that occurs in the main scanning direction due to a tilt of a deflecting surface of an optical deflector falls within an allowable range, and an image forming apparatus using the optical scanning apparatus.

It is another object of the present invention to provide a multi-beam optical scanning apparatus using an oblique incident optical system, which can obtain a satisfactory image by appropriately setting the elements such that the sum of the amount of jitter that occurs in the main scanning direction due to a tilt of a deflecting surface of an optical deflector and the amount of jitter that occurs when a plurality of light sources are used falls within an allowable range, and an image forming apparatus using the multi-beam optical scanning apparatus.

In one aspect of the invention, an optical scanning apparatus comprises an incident optical system for causing a light beam emitted from light source means to be obliquely incident in a sub-scanning cross-section on a deflecting surface of an optical deflector having a plurality of deflecting surfaces, and an imaging optical system for forming, on a scanned surface, an image of the light beam reflected/deflected by the deflecting surface of the optical deflector, wherein letting K (dpi) be a recording density in a main scanning direction on the scanned surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of the imaging optical system in a main scanning cross-section, f be a focal length of the imaging optical system, and φ be an angle a scanning central axis makes with an optical axis when an optical axis of the incident optical system opposing the deflecting surface is projected to the main scanning cross-section, a condition given by $$\left| \sin\frac{\theta}{2} \times \sin\gamma \left( \cos\alpha \times \sin\gamma \times \cos\phi \times \cos\frac{\theta}{2} + \right. \right.$$

$$\left|\cos\alpha \times \sin\gamma \times \sin\phi \times \sin\frac{\theta}{2} + \sin\alpha \times \cos\gamma\right| < \frac{6.35}{f \times K}$$

is satisfied.

In another aspect of the invention, at least some optical elements of the imaging optical system form some elements of the incident optical system.

In another aspect of the invention, the optical axis is substantially parallel to the scanning central axis when the optical axis of the incident optical system opposing the deflecting surface is projected to the main scanning cross-section.

In another aspect of the invention, the further comprises synchronization detection means, arranged near the scanned surface and including a slit, for controlling a timing at a scanning start position on the scanned surface, wherein the slit has an aperture portion inclined in a sub-scanning direction.

In another aspect of the invention, the light beam emitted from the light source means becomes incident on the deflecting surface while having a width larger than a main scanning width of the deflecting surface of the optical deflector.

In another aspect of the invention, in the foregoing apparatus, the recording density in the main scanning direction is not less than 1,200 dpi.

In another aspect of the invention, an image forming apparatus comprises the foregoing optical scanning apparatus and a photosensitive member placed on the scanned surface of the optical scanning apparatus, developing means for developing an electrostatic latent image formed by scanning the photosensitive member with the light beam as a toner image, transfer means for transferring the developed toner image to a paper sheet, and fixing means for fixing the transferred toner image on the paper sheet.

In another aspect of the invention, a multi-beam optical scanning apparatus comprises an incident optical system for causing a plurality of light beams emitted from light source means having a plurality of light-emitting units to be obliquely incident in a sub-scanning cross-section on a deflecting surface of an optical deflector having a plurality of deflecting surfaces, and an imaging optical system for forming, on a photosensitive drum surface, images of the plurality of light beam reflected/deflected by the deflecting surface of the optical deflector, wherein letting K (dpi) be a recording density in a main scanning direction on the scanned surface, $\gamma$ be an absolute value of a maximum difference in a tilt angle between the deflecting surfaces in the sub-scanning cross-section, $\alpha$ be an incident angle of the light beam incident on the deflecting surface in the sub-scanning cross-section, $\theta$ be a scanning angle of an outermost off-axis light beam with respect to an optical axis of the imaging optical system in a main scanning cross-section, f be a focal length of the imaging optical system, and $\phi$ be an angle a scanning central axis makes with an optical axis when an optical axis of the incident optical system opposing the deflecting surface is projected to the main scanning cross-section, R be a radius of the photosensitive drum, and $\epsilon1$ and $\epsilon2$ be incident angles of light beams which are separated from each other by the largest distance in the plurality of light beams incident on the photosensitive drum surface, a condition given by $$\left|2\sin\frac{\theta}{2} \times \sin\gamma\left(\cos\alpha \times \sin\gamma \times \cos\phi \times \cos\frac{\theta}{2} + \cos\alpha \times \sin\gamma \times \sin\phi \times \sin\frac{\theta}{2} + \right.\right.$$

$$\left.\left.\sin\alpha \times \cos\gamma\right)\right| + \frac{|R(\cos\epsilon1 - \cos\epsilon2)\tan\theta|}{f} < \frac{12.7}{f \times K}$$

is satisfied.

In another aspect of the invention, in the foregoing apparatus, at least some optical elements of the imaging optical system form some elements of the incident optical system.

In another aspect of the invention, in the foregoing apparatus, the optical axis is substantially parallel to the scanning central axis when the optical axis of the incident optical system opposing the deflecting surface is projected to the main scanning cross-section.

In another aspect of the invention, the apparatus further comprises synchronization detection means, arranged near the scanned surface and including a slit, for controlling a timing at a scanning start position on the scanned surface, wherein the slit has an aperture portion inclined in a sub-scanning direction.

In another aspect of the invention, in the foregoing apparatus, the plurality of light beams emitted from the light source means become incident on the deflecting surface while having a width larger than a main scanning width of the deflecting surface of the optical deflector.

In another aspect of the invention, in the foregoing apparatus, the recording density in the main scanning direction is not less than 1,200 dpi.

In another aspect of the invention, an image forming apparatus comprises the foregoing multi-beam optical scanning apparatus, a photosensitive member placed on the scanned surface of the multi-beam optical scanning apparatus, developing means for developing an electrostatic latent image formed by scanning the photosensitive member with the plurality of light beams as a toner image, transfer means for transferring the developed toner image to a paper sheet, and fixing means for fixing the transferred toner image on the paper sheet.

In another aspect of the invention, a multi-beam optical scanning apparatus comprises an incident optical system for causing a plurality of light beams emitted from light source means having a plurality of light-emitting units to be obliquely incident in a sub-scanning cross-section on a deflecting surface of an optical deflector having a plurality of deflecting surfaces, and an imaging optical system for forming, on a photosensitive surface formed from a flat surface, images of the plurality of light beam reflected/deflected by the deflecting surface of the optical deflector, wherein letting K (dpi) be a recording density in a main scanning direction on the photosensitive surface, $\gamma$ be an absolute value of a maximum difference in a tilt angle between the deflecting surfaces in the sub-scanning cross-section, $\alpha$ be an incident angle of the light beam incident on the deflecting surface in the sub-scanning cross-section, $\theta$ be a scanning angle of an outermost off-axis light beam with respect to an optical axis of the imaging optical system in a main scanning cross-section, f be a focal length of the imaging optical system, and $\phi$ be an angle a scanning central axis makes with an optical axis when an optical axis of the incident optical system opposing the deflecting surface is projected to the main scanning cross-section, $\epsilon3$ be incident angles of the plurality of light beams incident on the photosensitive surface, and L be a distance on the photosensitive surface between light beams which are separated from each other by the largest distance in the plurality of light beams incident on the photosensitive surface, a condition given by $$\left|2\sin\frac{\theta}{2}\times\sin\gamma\left(\cos\alpha\times\sin\gamma\times\cos\phi\times\cos\frac{\theta}{2}+\cos\alpha\times\sin\gamma\times\sin\phi\times\sin\frac{\theta}{2}+\sin\alpha\times\cos\gamma\right)\right|+\frac{|L\sin\epsilon3\times\tan\theta|}{f}<\frac{12.7}{f\times K}$$

is satisfied.

In another aspect of the invention, in the foregoing apparatus, at least some optical elements of the imaging optical system form some elements of the incident optical system.

In another aspect of the invention, in the foregoing apparatus, the optical axis is substantially parallel to the scanning central axis when the optical axis of the incident optical system opposing the deflecting surface is projected to the main scanning cross-section.

In another aspect of the invention, the apparatus, further comprises synchronization detection means, arranged near the scanned surface and including a slit, for controlling a timing at a scanning start position on the scanned surface, wherein slit has an aperture portion inclined in a sub-scanning direction.

In another aspect of the invention, in the foregoing apparatus, the plurality of light beams emitted from the light source means become incident on the deflecting surface while having a width larger than a main scanning width of the deflecting surface of the optical deflector.

In another aspect of the invention, in the foregoing apparatus, the recording density in the main scanning direction is not less than 1,200 dpi.

In another aspect of the invention, an image forming apparatus comprises the foregoing multi-beam optical scanning apparatus, a photosensitive member placed on the scanned surface of the multi-beam optical scanning apparatus, developing means for developing an electrostatic latent image formed by scanning the photosensitive member with the plurality of light beams as a toner image, transfer means for transferring the developed toner image to a paper sheet, and fixing means for fixing the transferred toner image on the paper sheet.

In another aspect of the invention, an image forming apparatus comprises the foregoing optical scanning apparatus and a printer controller for converting code data received from an external device into an image signal and inputting the image signal to the optical scanning apparatus.

In another aspect of the invention, an image forming apparatus comprises the foregoing multi-beam optical scanning apparatus, and a printer controller for converting code date received from an external device into an image signal and inputting the image signal to the multi-beam optical scanning apparatus.

BRIEF DESCRIPTION OF THE DRAWINGS

FIG. 8 is a sub-scanning sectional view showing the structure near the f-θ lens of a conventional optical scanning apparatus;

FIG. 9 is a sub-scanning sectional view showing the structure near the f-θ lens according to the first embodiment of the present invention;

DETAILED DESCRIPTION OF THE PREFERRED EMBODIMENTS

[First Embodiment]

Figure 1:
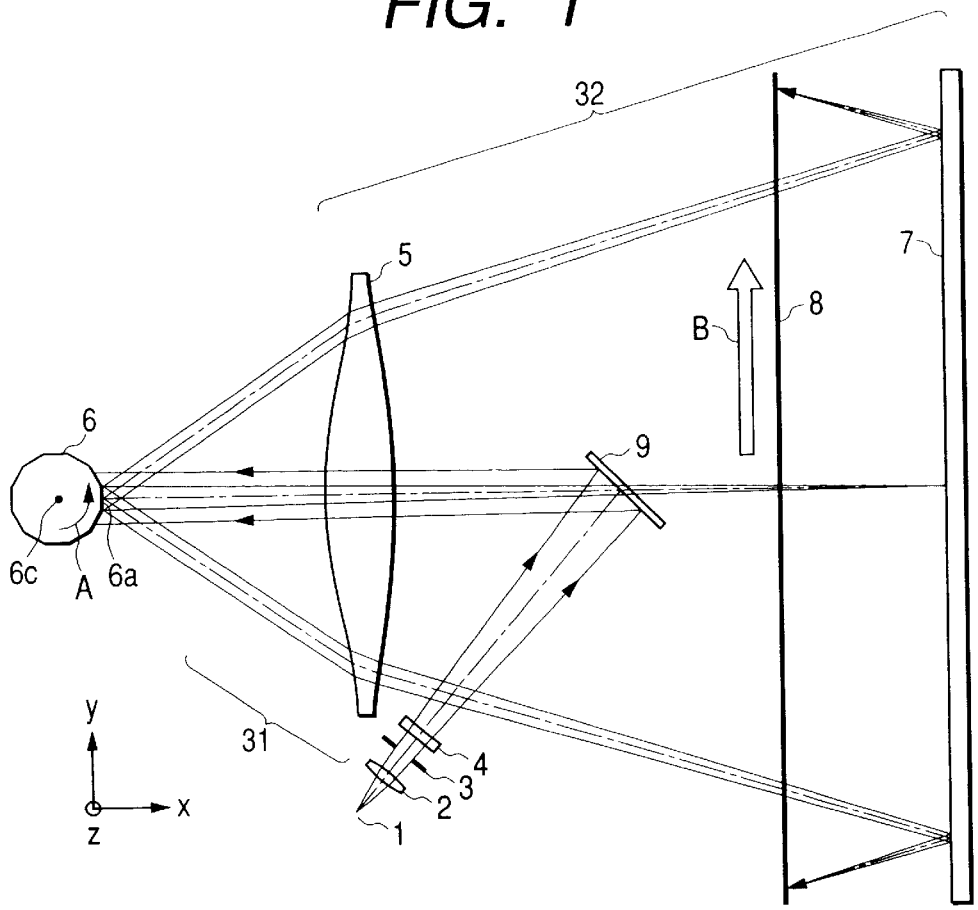
FIG. 1 is a plan view showing the main part of the first embodiment of the present invention.
Figure 2:
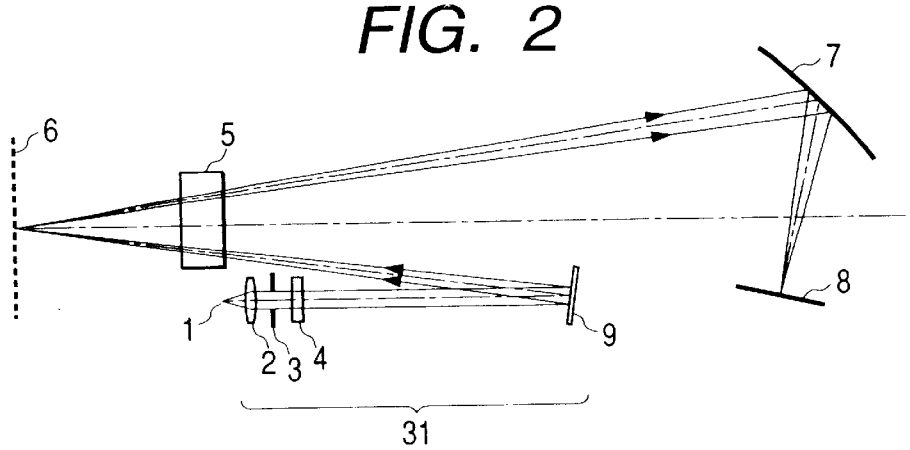
FIG. 2 is a side view showing the main part of the first embodiment of the present invention.
Figure 3:
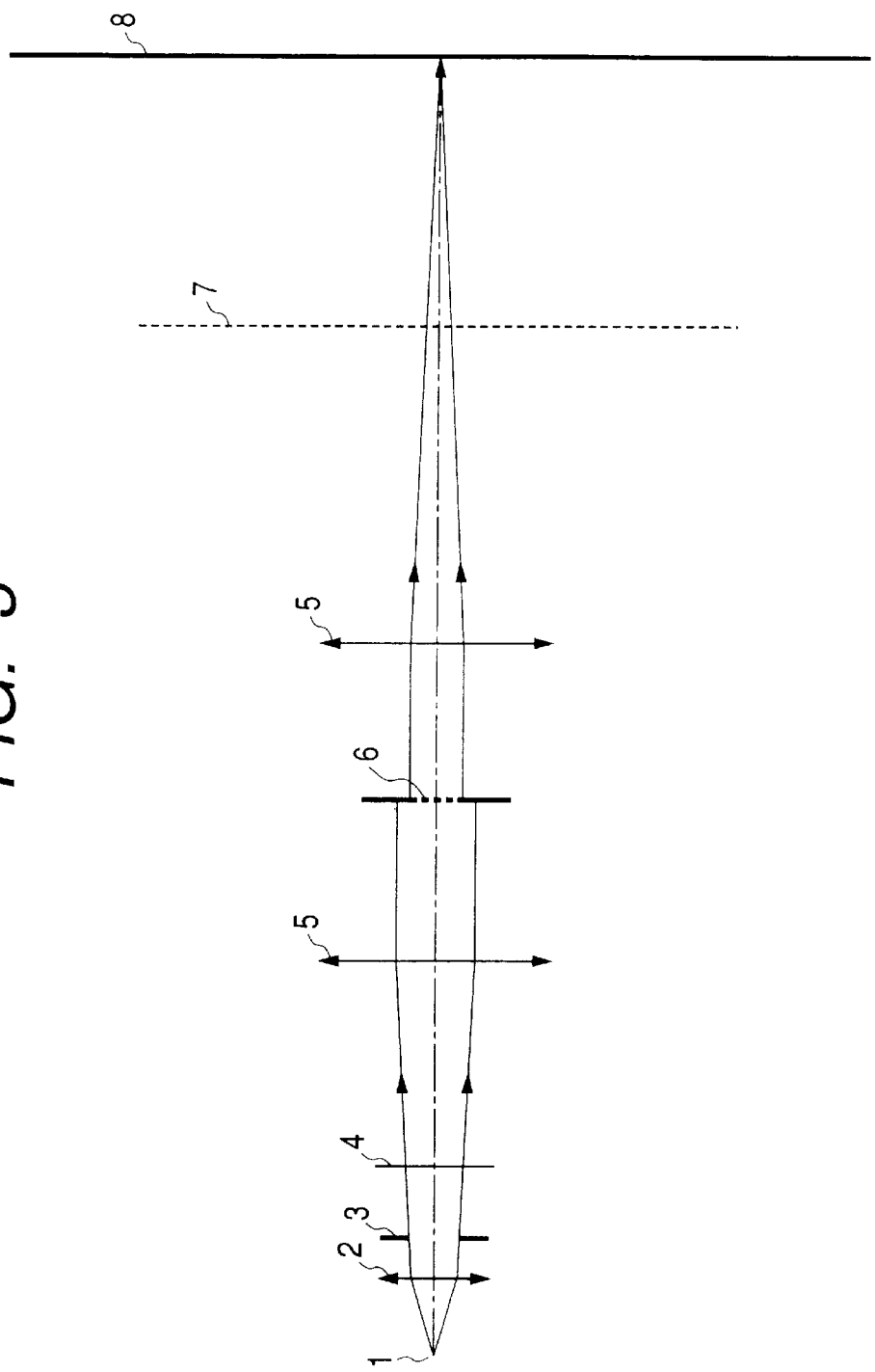
FIG. 3 is an exploded view showing the first embodiment of the present invention when exploded along a light beam in the main scanning direction.
Figure 4:
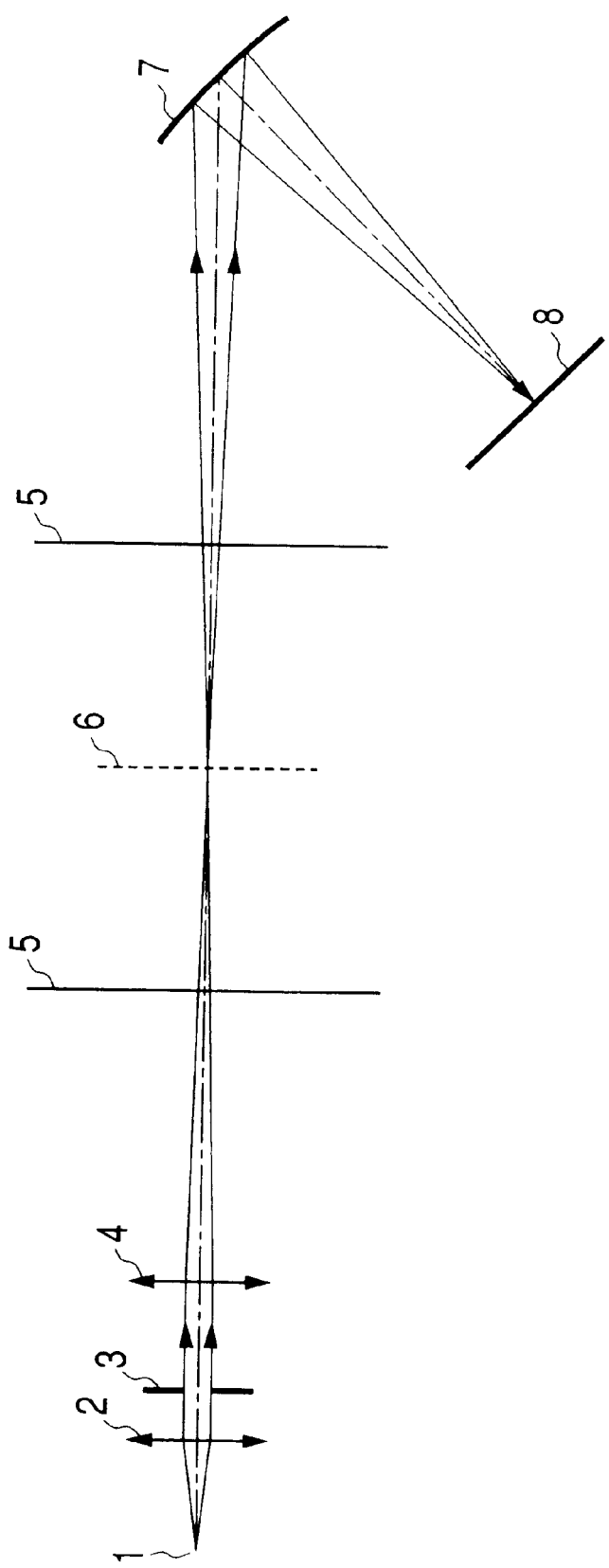
FIG. 4 is an exploded view showing the first embodiment of the present invention when exploded along a light beam in the sub-scanning direction.

FIG. 1 is a plan view showing the main part of the first embodiment when an optical scanning apparatus of the present invention is applied to an image forming apparatus such as a laser beam printer or digital copying machine. FIG. 1 shows a state wherein each element is projected to the main scanning cross-section. FIG. 2 is a side view showing the main part shown in FIG. 1 in a state wherein each element is projected to the sub-scanning cross-section. FIG. 3 is an exploded view showing the first embodiment of the present invention when exploded along a light beam in the main scanning direction. FIG. 4 is an exploded view along the sub-scanning direction in FIG. 3.

In this specification, a plane perpendicular to a rotational axis (6c) of an optical deflector (6), including a point where the principal ray strikes a deflecting surface (6a), is defined as a main scanning cross-section (x-y section), and a plane perpendicular to the main scanning cross-section is defined as a sub-scanning cross-section (x-z section).

An axis (x-axis in FIG. 1) serving as a scanning center in the main scanning cross-section (x-y section) is called a scanning central axis.

Referring to FIG. 1, a light source means 1 is formed by, e.g., a semiconductor laser. A collimator lens 2 converts a divergent light beam emitted from the semiconductor laser 1 into an almost parallel light beam. A stop (slit member) 3 limits the passing light beam (light amount).

A cylindrical lens (cylinder lens) 4 has a predetermined refracting power only in the sub-scanning direction so the light beam passing through the stop 3 forms an almost linear image on the deflecting surface (deflecting/reflecting surface) 6a of the optical deflector 6 (to be described later) in the main scanning cross-section.

A return mirror 9 returns the light beam transmitted through the cylindrical lens 4 to the optical deflector 6 side.

Each of the collimator lens 2, stop 3, cylindrical lens 4, return mirror 9, and f-θ lens 5 (to be described later) forms one element of an incident optical system 31.

Note that the optical axis of the incident optical system opposing the deflecting surface means an optical axis that is defined for the incident optical system when its optical path is exploded to one optical path including the light beam incident point on the deflecting surface.

The optical deflector 6 having a plurality of deflecting surfaces is formed by, e.g., a rotary polyhedral mirror (polygon mirror) and rotated at a predetermined speed in the direction indicated by an arrow A in FIG. 1 by a driving means (not shown) such as a motor.

An imaging optical system 32 having a focus function and f-θ characteristics has the single f-θ lens (f-θ lens system) 5 and a cylindrical mirror 7 having a predetermined refracting power only in the sub-scanning direction. The imaging optical system 32 forms the image of the deflected light beam onto a scanned surface 8 and makes the deflecting surface 6a of the optical deflector 6 almost optically conjugate to the scanned surface 8 in the sub-scanning cross-section, thereby correcting the tilt of the deflecting surface 6a. The f-θ lens 5 also forms one element of the incident optical system 31, as described above. Note that the f-θ lens system may be constituted by a plurality of lenses.

The photosensitive drum surface 8 serves as a scanned surface.

This embodiment is designed such that an optical axis obtained by projecting the optical axis of the incident optical system 31 opposing the deflecting surface to the main scanning cross-section becomes almost parallel to the scanning central axis.

In this embodiment, in the main scanning cross-section shown in FIG. 1, a divergent light beam emitted from the semiconductor laser 1 is converted into an almost parallel light beam by the collimator lens 2, limited (in light amount) by the stop 3, and strikes the cylindrical lens 4. The almost parallel light beam incident on the cylindrical lens 4 emerges in that state, passes through the f-θ lens 5 through the return mirror 9, and becomes incident on the deflecting surface 6a from almost the center of the deflecting angle of the optical deflector 6 (front incidence). At this time, the light beam incident on the optical deflector 6 becomes incident on the deflecting surface 6a while having a width larger than the main scanning width of the deflecting surface 6a of the optical deflector 6 (over-field optical system). The light beam deflected/reflected by the deflecting surface 6a of the optical deflector 6 is converged as it passes through the f-θ lens 5 again, and guided onto the photosensitive drum surface 8 through the cylindrical mirror 7.

On the other hand, in the sub-scanning cross-section shown in FIG. 2, the divergent light beam emitted from the semiconductor laser 1 is converted into an almost parallel light beam by the collimator lens 2, limited (in light amount) by the stop 3, and strikes the cylindrical lens 4. The almost parallel light beam incident on the cylindrical lens 4 is converged, transmitted through the f-θ lens 5 via the return mirror 9, and becomes incident on the deflecting surface 6a of the optical deflector 6 at a predetermined angle with respect to the normal to the deflecting surface 6a to form an almost linear image (linear image elongated in the main scanning direction) on the deflecting surface 6a (oblique incident optical system). The light beam deflected/reflected by the deflecting surface 6a of the optical deflector 6 is transmitted through the f-θ lens 5 again, converged by the cylindrical mirror 7, and guided onto the photosensitive drum surface 8. When the optical deflector 6 is rotated about the rotational axis 6c in the direction indicated by an arrow A, the photosensitive drum surface 8 is optically scanned in the direction indicated by an arrow B (main scanning direction). With this operation, an image is recorded on the photosensitive drum surface 8 serving as a recording medium.

Figure 5:
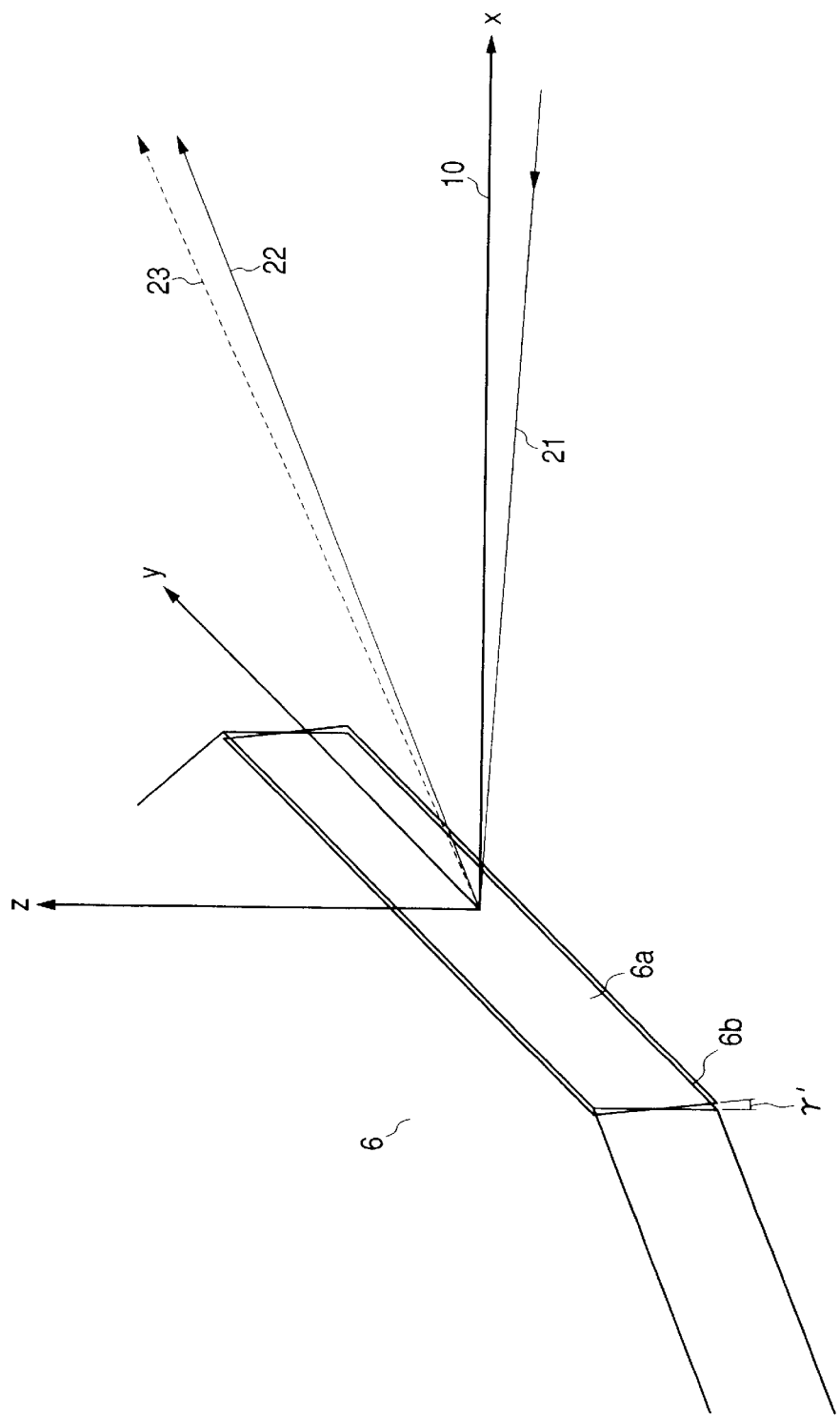
FIG. 5 is an explanatory view of the structure near a deflecting surface of an optical deflector according to the first embodiment of the present invention.

FIG. 5 is an enlarged explanatory view showing the structure near the optical deflector so as to explain a state wherein the light beam from the incident optical system becomes incident on the deflecting surface of the optical deflector and is reflected/deflected, together with a tilt of the deflecting surface.

Referring to FIG. 5, the structure is formed from an optical axis 10 of the f-θ lens (not shown), the optical deflector 6, the deflecting surface 6a without any tilt, a deflecting surface 6b with a tilt, an incident light beam 21 on the deflecting surface, a reflected light beam 22 reflected/deflected by the deflecting surface 6a, and a reflected light beam 23 reflected/deflected by the deflecting surface 6b with a tilt. An angle γ' is a maximum tilt angle of the deflecting surface 6a with respect to a certain deflecting surface. The x-axis is defined in the direction of optical axis of the f-θ lens, the y-axis is defined in the main scanning direction, and the z-axis is defined in a direction perpendicular to the x- and y-axes (sub-scanning direction).

Figure 6:
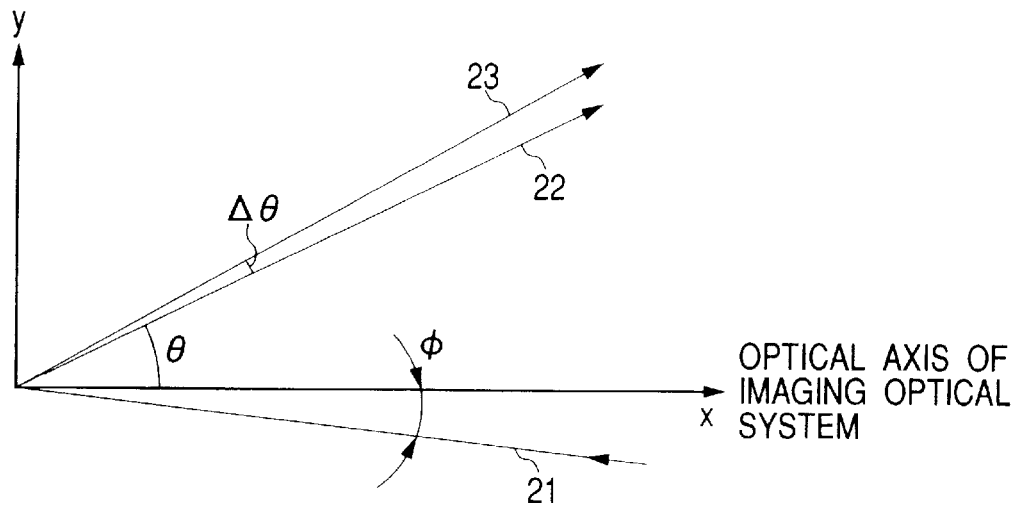
FIG. 6 is a main scanning sectional view showing the structure near the optical deflector according to the first embodiment of the present invention.

Referring to FIG. 5, the incident light beam 21 transmitted through the incident optical system (not shown) becomes incident on the deflecting surface 6a of the optical deflector 6. When the optical deflector 6 rotates in a predetermined direction, the direction of reflected light beam 22 changes, so the light scans in the main scanning direction. FIG. 6 shows the maximum view angle of drawing at this time.

FIG. 6 is an explanatory view showing a state wherein the light beam at the maximum view angle is projected onto the x-y plane (main scanning cross-section). Referring to FIG. 6, the incident light beam 21 on the deflecting surface of the optical deflector (this incident light beam 21 matches the optical axis of the incident optical system 31 opposing the deflecting surface) is incident at a predetermined angle φ with respect to the x-axis and is reflected/deflected by the deflecting surface at a maximum view angle (scanning angle of the most off-axis light beam with respect to the x-axis) θ. If the deflecting surface has a tilt at the angle γ', the reflected light beam 23 reflected/deflected by the deflecting surface travels in a direction which is different from that of the reflected light beam 22 by an angle Δθ. The reflected light beam 23 shifted by the angle Δθ forms an image with a shift on the scanned surface by the f-θ lens (not shown). The shift amount on the scanned surface corresponds to the jitter amount in the main scanning direction.

Figure 7:
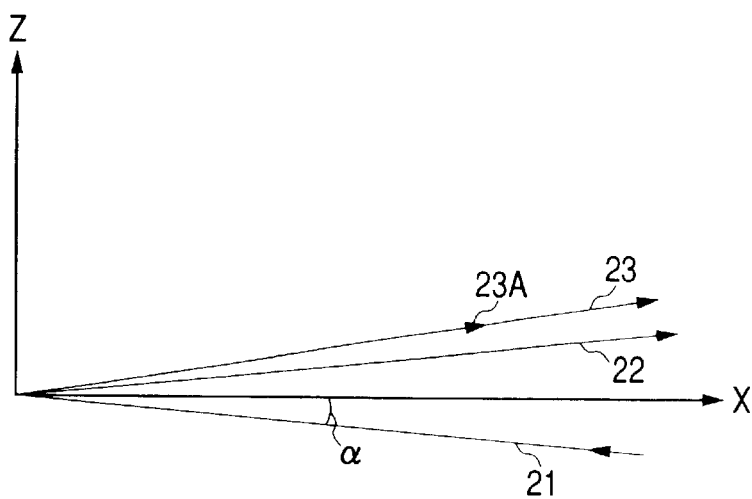
FIG. 7 is a sub-scanning sectional view showing the structure near the optical deflector according to the first embodiment of the present invention.

FIG. 7 is an explanatory view of a case wherein the incident light beam and reflected light beam on the deflecting surface are projected to the x-z plane (sub-scanning cross-section). As shown in FIG. 7, the normal direction of the deflecting surface matches the x-axis. The incident light beam 21 on the deflecting surface becomes incident with a predetermined angle α with respect to the x-axis. If the deflecting surface has a tilt at the angle γ', the light beam reflected/deflected by the deflecting surface is the reflected light beam 23 which travels in the direction indicated by an arrow 23A. In the sub-scanning cross-section, however, since the f-θ lens has a tilt correction function, the light beam becomes incident on the image plane with its tilt amount corrected, as described above.

Letting γ be the absolute value of the maximum difference in tilt angle between the deflecting surfaces in the sub-scanning cross-section, α be the incident angle of the light beam incident on the deflecting surface in the sub-scanning cross-section, θ be the scanning angle of the most off-axis light beam with respect to the optical axis of the imaging optical system 32 in the main scanning cross-section, f be the focal length of the imaging optical system 32 and φ be the angle an optical axis obtained makes with the scanning center axis when the optical axis of the incident optical system 31 opposing the deflecting surface is projected to the main scanning cross-section and, a jitter amount J in the main scanning direction is given by $$J = \left| 2f\sin\frac{\theta}{2} \times \sin\gamma \right.$$
$$\left. \left( \cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma \right) \right|$$

When the deflecting surface inclines, the drawing position expands/contracts to both sides of the optical axis. For this reason, even when BD detection can be done at the center to minimize any jitter at the center, the drawing position does shift by the above amount.

The allowable amount of an image for the jitter amount becomes strict in proportion to the recording density (image density), and is limited to about ½ the number of pixels determined from the recording density.

In this embodiment, letting K (dpi) be the recording density on the scanned surface in the main scanning direction, the respective elements are set such that the above-described parameters satisfy $$\left| \sin\frac{\theta}{2} \times \sin\gamma \left( \cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma \right) \right| < \frac{1}{2 \cdot f} \times \frac{1}{2} \times \frac{25.4}{K} = \frac{6.35}{f \times K} \quad (1)$$

With this arrangement, in the optical scanning apparatus using the oblique incident optical system of this embodiment, the main scanning jitter that occurs due to a tilt of the deflecting surface of the optical deflector can be suppressed (to about ½ the number of pixels determined from the recording density), thereby obtaining a satisfactory image.

[Double-Path Structure]

The reason why the f-θ lens is used as an element of the incident optical system of this embodiment will be described below with reference to FIGS. 8 and 9.

FIG. 8 is a sub-scanning sectional view showing the main part of a conventional optical system. FIG. 8 shows a structure in which the optical axis of the incident optical system does not interfere with the f-θ lens. FIG. 9 is a sub-scanning sectional view showing the main part of the optical system of this embodiment. FIG. 9 shows a structure in which the f-θ lens forms one element of the incident optical system. The same reference numerals as in FIG. 1 denote the same elements in FIG. 9.

Referring to FIG. 8, to prevent interference between an fθ lens 35 and an incident light beam 83 on an optical deflector 86, an angle equal to or smaller than an incident angle α' cannot be set. Since the amount of jitter due to oblique incidence increases as the incident angle α' becomes large, the incident angle α' must be suppressed small.

In this embodiment, as shown in FIG. 9, the f-θ lens 5 is used as an element of the incident optical system, thereby constructing a so-called double-path structure in which an incident light beam 93 passes through the f-θ lens 5, and a reflected light beam 94 also passes through the f-θ lens 5. With this structure, an incident angle α" of the incident light beam 93 on the deflecting surface can be suppressed small, and the allowable amount for the tilt of the deflecting surface can be relaxed. This incident angle α" can be minimized as long as the incident light beam 93 and reflected light beam 94 can be separated from each other.

[Front Incidence]

The reason why the incident optical system of this embodiment is constituted as a front incident system will be described below with reference to FIGS. 10 and 11.

Figure 10:
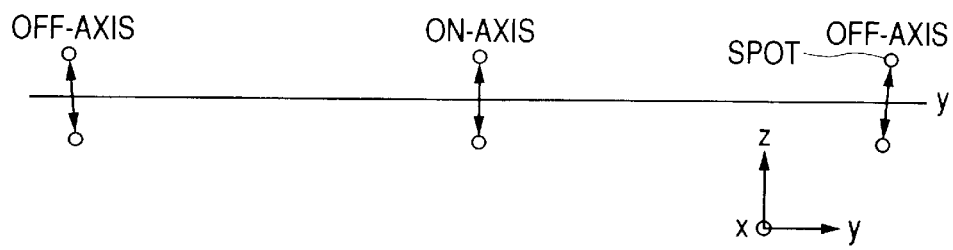
FIG. 10 is an explanatory view showing movement of a light beam incident position on the scanned surface in the first embodiment of the present invention.
Figure 11:
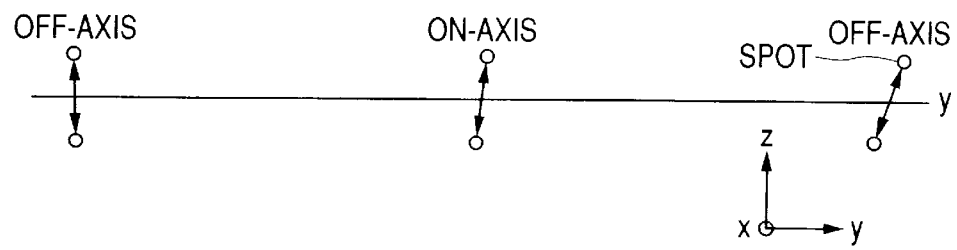
FIG. 11 is an explanatory view showing movement of a light beam incident position on the scanned surface of the conventional optical scanning apparatus.

FIGS. 10 and 11 are explanatory views showing light beam incident positions on the scanned surface in the sub-scanning cross-section of this embodiment. FIG. 10 shows a state wherein the scanning central axis is almost parallel to the optical axis obtained when the optical axis of the incident optical system opposing the deflecting surface is projected to the main scanning cross-section. FIG. 11 shows a state wherein the scanning central axis has an angle with respect to the optical axis obtained when the optical axis of the incident optical system opposing the deflecting surface is projected to the main scanning cross-section.

Each arrow in FIGS. 10 and 11 indicates movement of the light beam incident position on the drum surface when the deflecting surface has a tilt. More specifically, each arrow in FIGS. 10 and 11 indicates a variation in spot irradiation position, which is observed when a sensor such as a CCD is arranged on the image plane. In this embodiment, a so-called tilt relaxing system in which the light beam on the scanned surface has a vertical width to some extent with respect to the tilt of the deflecting surface is shown for the illustrative convenience of the explanatory views. When the deflecting surface has no tilt, the light beam is on the y-axis. When the deflecting surface has a tilt, the light beam incident position changes in the direction indicated by each arrow in FIGS. 10 and 11. Referring to FIGS. 10 and 11, the arrows at the center indicate the on-axis position, and the arrows on the left and right ends indicate movement of the light beam at the maximum view angle.

As shown in FIG. 10, it is advantageous to distribute the main scanning jitter amount due to oblique incidence almost symmetrically with respect to the image center. More specifically, as shown in FIG. 11, when the jitter amount is distributed almost symmetrically with respect to the image center, the y-direction moving amount at the right end portion of the image can be made smaller. In addition, when the value of parameter φ of condition (1) is small, condition (1) can more readily be satisfied.

Hence, in this embodiment, as described above, by employing the incident optical system of so-called front incidence (on-axis incidence) type in which the scanning central axis is almost parallel to the optical axis obtained when the optical axis of the incident optical system opposing the deflecting surface is projected to the main scanning cross-section, the jitter amount in the main scanning direction can be distributed almost symmetrically with respect to the image center, so the jitter amount can be suppressed small, and a more satisfactory image can be obtained.

[Second Embodiment]

Figure 12:
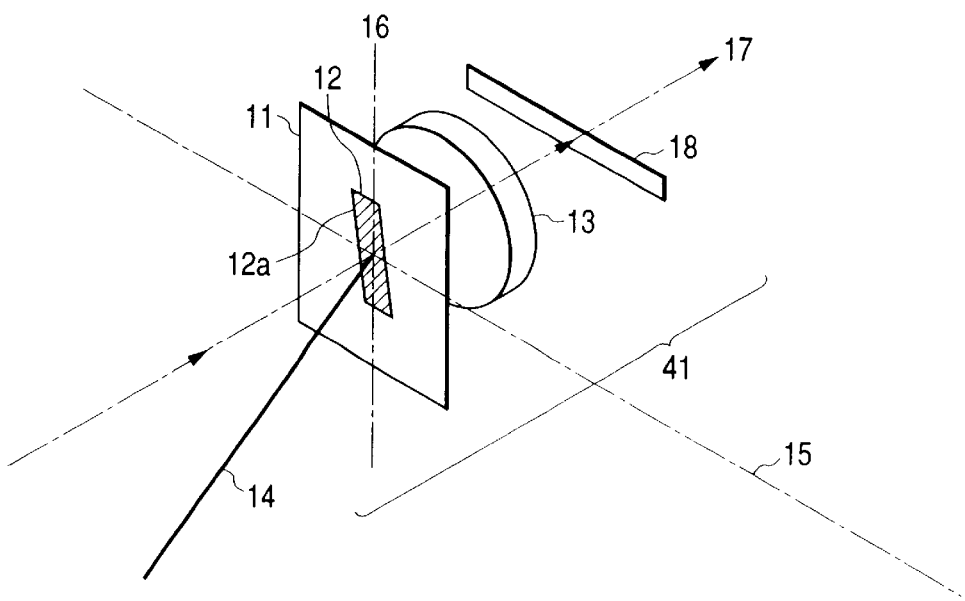
FIG. 12 is a schematic view showing the main part near a synchronization detection means according to the second embodiment of the present invention.

FIG. 12 is a schematic view showing the main part near a synchronization detection means of an optical scanning apparatus according to the second embodiment of the present invention.

The second embodiment is different from the above-described first embodiment in that in an optical scanning apparatus having a synchronization detection means, the aperture portion of a slit that forms one element of the synchronization detection means is inclined in the sub-scanning direction by a predetermined amount which almost matches the shift amount (jitter amount) of the beam position (light beam incident position) when the deflecting surface of the optical deflector has a tilt. The remaining structures and optical functions are almost the same as those of the first embodiment, and the same effect as that of the first embodiment is obtained.

More specifically, referring to FIG. 12, a slit (to be referred to as a "BD slit" hereinafter) 12 is formed in a silt substrate 11 and placed at a position equivalent to the photosensitive drum surface. The BD slit 12 has a linear aperture portion (edge portion) 12a. In this embodiment, this linear aperture portion 12a is inclined in a sub-scanning direction 16 by a predetermined amount which almost matches the shift amount of the beam position when the deflecting surface has a tilt.

An imaging lens (to be referred to as a "BD lens" hereinafter) 13 serves as an imaging means. An optical sensor (to be referred to as a "BD sensor" hereinafter) 18 serves as a synchronization detection element. In this embodiment, the timing at the scanning start position of image recording on the photosensitive drum surface is adjusted using a write position sync signal (BD signal) obtained by detecting the output signal from the BD sensor 18. FIG. 12 also shows a light beam 14, main scanning direction 15, sub-scanning direction 16, and optical-axis direction 17. Note that each of the BD slit 12, BD lens 13, BD sensor 18, and the like forms one element of a synchronization detection means 41.

Figure 13:
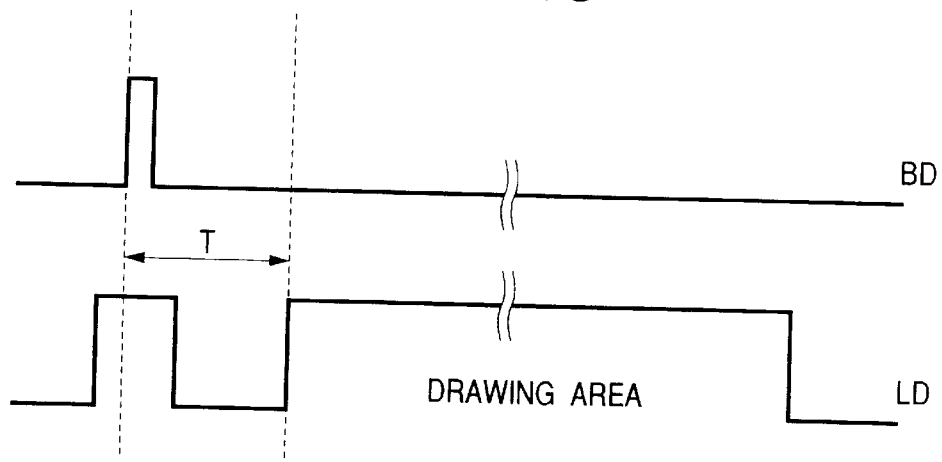
FIG. 13 is an explanatory view showing the BD timing according to the second embodiment of the present invention.

FIG. 13 is an explanatory view showing the relationship between the BD detection signal (BD signal) and an image drawing signal (LD signal). Referring to FIG. 13, the write position is determined by starting drawing an image time T after the BD signal is detected. Since the system of this embodiment is a tilt relaxing system, the drawing position is shifted in the vertical direction (sub-scanning direction) of the scanned surface due to the tilt of the deflecting surface of the optical deflector.

Figure 14:
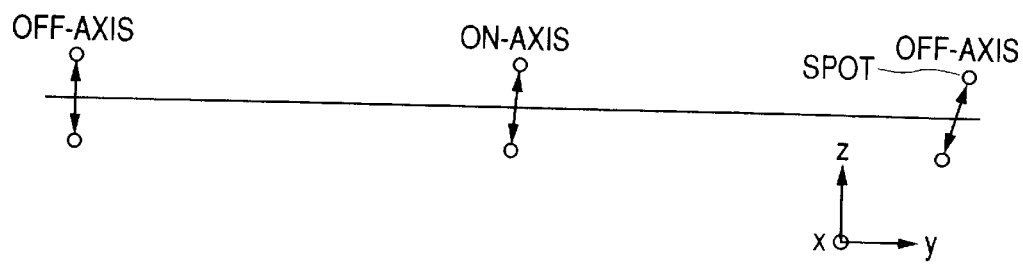
FIG. 14 is an explanatory view showing movement of the light beam incident position on the scanned surface of the conventional optical scanning apparatus when the slit is not inclined.
Figure 15:
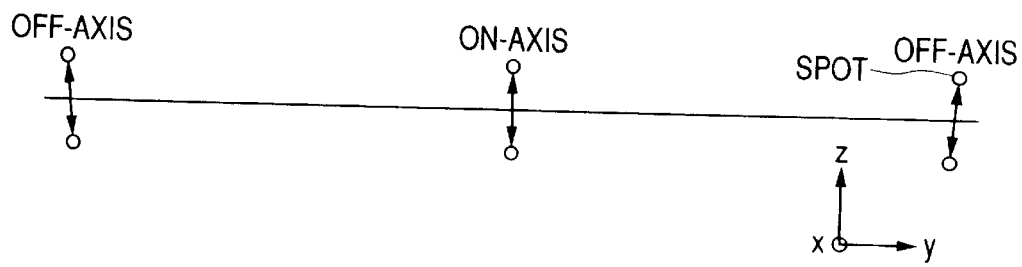
FIG. 15 is an explanatory view showing movement of a light beam incident position on the scanned surface in the second embodiment of the present invention.

FIGS. 14 and 15 are explanatory views showing light beam incident positions on the scanned surface in the sub-scanning cross-section of this embodiment. FIG. 14 shows a case wherein the aperture portion of the slit is not inclined. FIG. 15 shows a case wherein the aperture portion of the slit is inclined to correct the shift in drawing position on the scanned surface. Each arrow in FIGS. 14 and 15 indicates movement of the light beam incident position on the drum surface when the deflecting surface has a tilt. More specifically, FIGS. 14 and 15 show a variation in spot irradiation position, which is observed when a sensor such as a CCD is arranged on the image plane.

When the aperture portion 12a of the slit 12 is inclined as in this embodiment, the maximum drawing position shift amount by the oblique incident optical system is almost ½ that without correction. Note that when the incline angle of the aperture portion 12a of the slit 12 increases, the drawing position shift in the sub-scanning direction causes jitter. Hence, the shift in the sub-scanning direction need be ensured to some degree with respect to the shift in the main scanning direction. To achieve this, a system of type with a relaxed tilt correction magnification is constituted.

[Third Embodiment]

The third embodiment of the present invention will be described next.

The third embodiment is different from the above-described first embodiment in that in a multi-beam optical scanning apparatus using a multi-laser light source having a plurality of light-emitting units (light sources), the elements are set such that the sum of the amount of jitter that occurs when a plurality of light sources are used and the amount of jitter that occurs due to the tilt of the deflecting surface of the optical deflector satisfies condition (2) to be described later. The remaining structures and optical functions are almost the same as those of the first embodiment, and the same effect as that of the first embodiment is obtained.

In a multi-beam optical scanning apparatus using a multi-laser light source as in this embodiment, jitter occurs in the following way in principle due to a plurality of light sources (a plurality of light beams).

Normally, when a light beam is directed toward a photosensitive drum surface 161 from its front, the light beam reflected by the photosensitive drum surface 161 returns to the light source. To prevent this, the light beam is so directed toward the photosensitive drum surface 161 as to be obliquely incident on the photosensitive drum surface (with an angle with respect to the optical axis).

Figure 16:
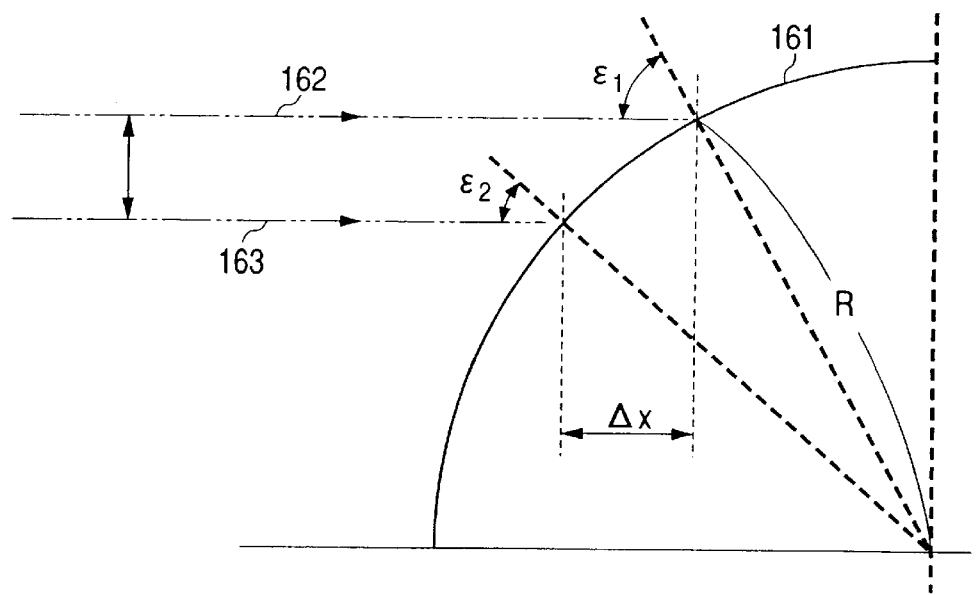
FIG. 16 is an explanatory view showing jitter generated by a plurality of light beams in the third embodiment of the present invention.
Figure 17:
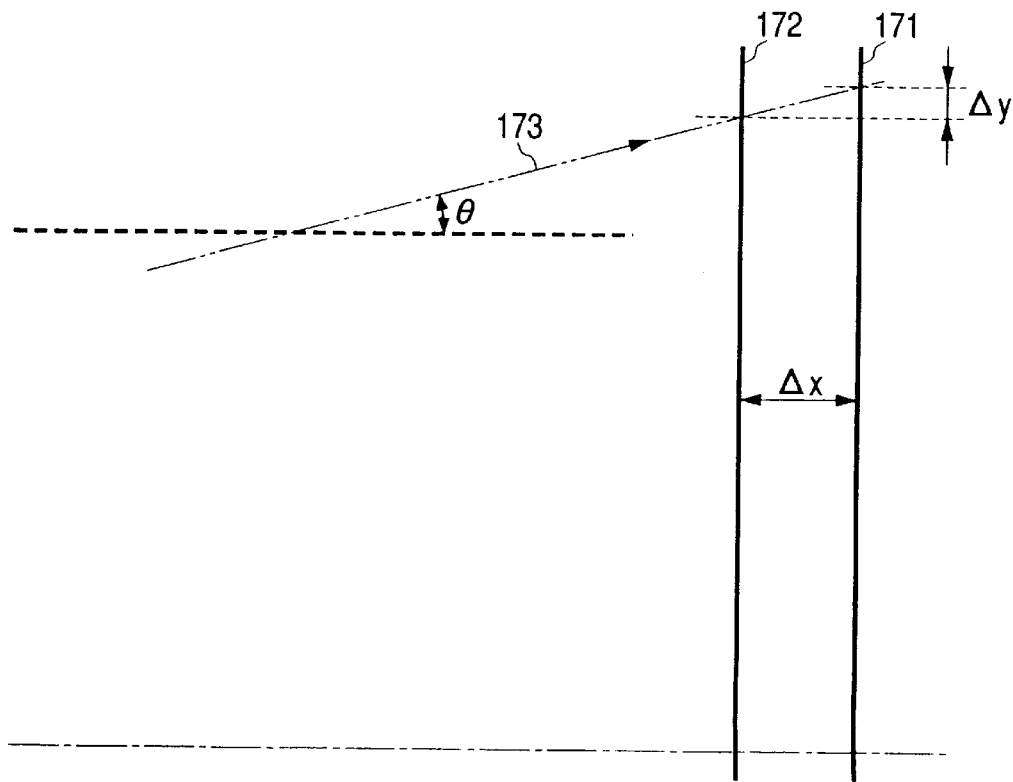
FIG. 17 is an explanatory view showing jitter generated by a plurality of light beams in the third embodiment of the present invention.

FIGS. 16 and 17 are enlarged explanatory views showing part on the photosensitive drum surface where jitter occurs. FIG. 16 is a main scanning sectional view showing incidence of an on-axis light beam on the photosensitive drum surface. FIG. 17 is an explanatory view showing the state of an most off-axis light beam in the main scanning cross-section.

Referring to FIG. 16, the apparatus has the photosensitive drum surface 161, an uppermost light beam (upper light beam) 162 of a plurality of light beams emitted from the multi-laser light source, and a lowermost light beam (lower light beam) 163. Let R be the radius of the photosensitive drum, $\epsilon_1$ be the incident angle of the upper light beam 162 on the photosensitive drum, and $\epsilon_2$ be the incident angle of the lower light beam 163.

Referring to FIG. 17, the upper light beam is at a position 171 on the photosensitive drum, and the lower light beam is at a position 172 on the photosensitive drum. The apparatus also includes an most off-axis upper and lower light beams 173. The most off-axis light beam in the main scanning cross-section becomes incident on the photosensitive drum surface at an incident angle e (scanning angle of the most off-axis light beam 173 with respect to the optical axis of the f-θ lens).

As shown in FIGS. 16 and 17, the upper and lower light beams 162 and 163 have an optical path difference $\Delta x$ in the direction of optical axis between their light beam incident positions. Hence, a drawing position shift $\Delta y$ in the main scanning direction is generated between the upper light beam 162 and the lower light beam 163. Using the above-described parameters, the drawing position shift amount $\Delta y$ is given by $$\Delta y = |R(\cos \epsilon 1 - \cos \epsilon 2) \tan \theta|$$

This drawing position shift amount Δy is the jitter amount in the multi-beam optical scanning apparatus using the plurality of light beams. When the plurality of light beams are used, the sum of this jitter amount and the amount of jitter that occurs due to the tilt of the deflecting surface of the optical deflector must be set within an allowable range (about ½ the number of pixels determined from the recording density).

In this embodiment, the respective elements are set using the above-described parameters to satisfy $$\left| 2\sin\frac{\theta}{2} \times \sin\gamma \left( \cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma \right) \right| + \frac{R(\cos\epsilon 1 - \cos\epsilon 2)\tan\theta|}{f} < \frac{12.7}{f \times K} \quad (2)$$

Thus, the jitter amount can be suppressed within the allowable range, and a satisfactory image is obtained.

[Fourth Embodiment]

The fourth embodiment of the present invention will be described next.

The fourth embodiment is different from the above-described third embodiment in that in a multi-beam optical scanning apparatus using a flat photosensitive member having a flat surface, the elements are set to satisfy condition (3) to be described later. The remaining structures and optical functions are almost the same as those of the third embodiment, and the same effect as that of the third embodiment is obtained.

Figure 18:
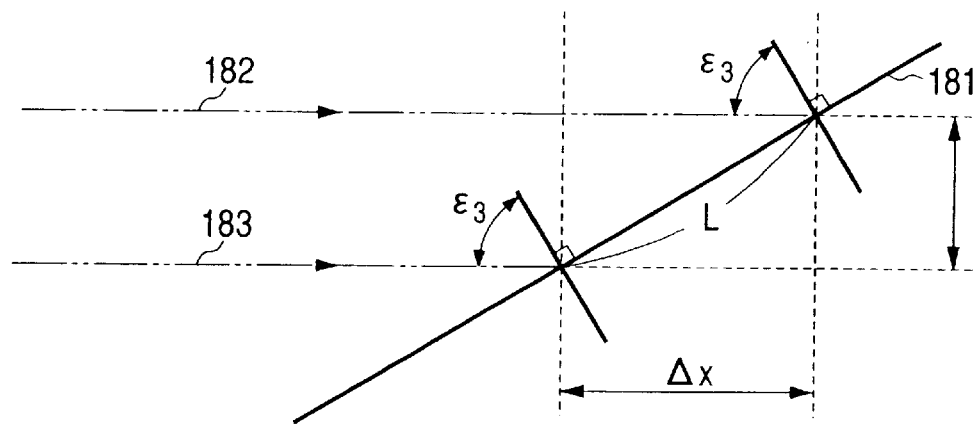
FIG. 18 is an explanatory view showing jitter generated by a plurality of light beams in the fourth embodiment of the present invention.

FIG. 18 is a main scanning cross-section view showing the state of incidence of an on-axis light beam on the photosensitive surface. Referring to FIG. 18, the apparatus has a photosensitive surface 181 made of a flat surface, an uppermost light beam (upper light beam) 182 of a plurality of light beams emitted from the multi-laser light source, and a lowermost light beam (lower light beam) 183 of the plurality of light beams. Letting ϵ3 be the incident angle of each of the plurality of light beams incident on the photosensitive surface 181, and L be the distance between the upper light beam 182 and the lower light beam 183 on the photosensitive surface 181, the light beams at the two ends have an optical path difference Δx in the direction of optical axis. As shown in FIG. 18, the incident positions of the upper light beam 182 and lower light beam 183 are shifted by a drawing position shift Δy in the main scanning direction. The drawing position shift amount Δy is given by $$\Delta y = L \sin\epsilon 3 \times \tan\theta$$

This drawing position shift amount Δy is the jitter amount in the multi-beam optical scanning apparatus using the plurality of light beams. When the plurality of light beams are used, the sum of this jitter amount and the amount of jitter that occurs due to a tilt of the deflecting surface of the optical deflector must be set within an allowable range (about ½ the number of pixels determined from the recording density).

In this embodiment, the respective elements are set using the above-described parameters to satisfy $$\left| 2\sin\frac{\theta}{2} \times \sin\gamma \left( \cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma \right) \right| + \frac{|L\sin\epsilon 3 \times \tan\theta|}{f} < \frac{12.7}{f \times K} \quad (3)$$

Thus, the jitter can be suppressed within the allowable range, and a satisfactory image is obtained.

[Image Forming Apparatus]

Figure 19:
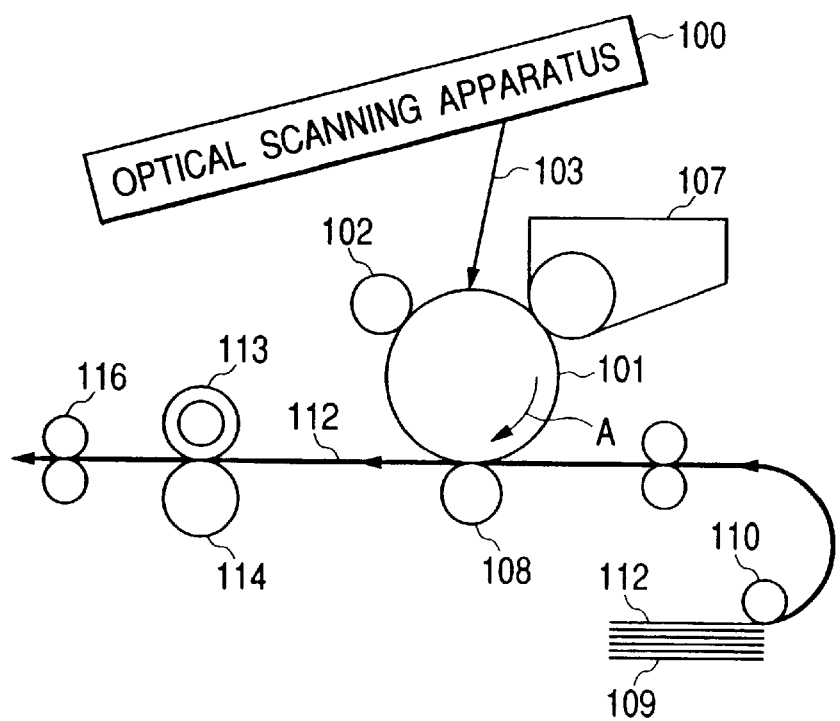
FIG. 19 is a sectional view showing the sub-scanning-direction main part of an electrophotographic printer using the optical scanning optical system of the present invention.
Figure 20:
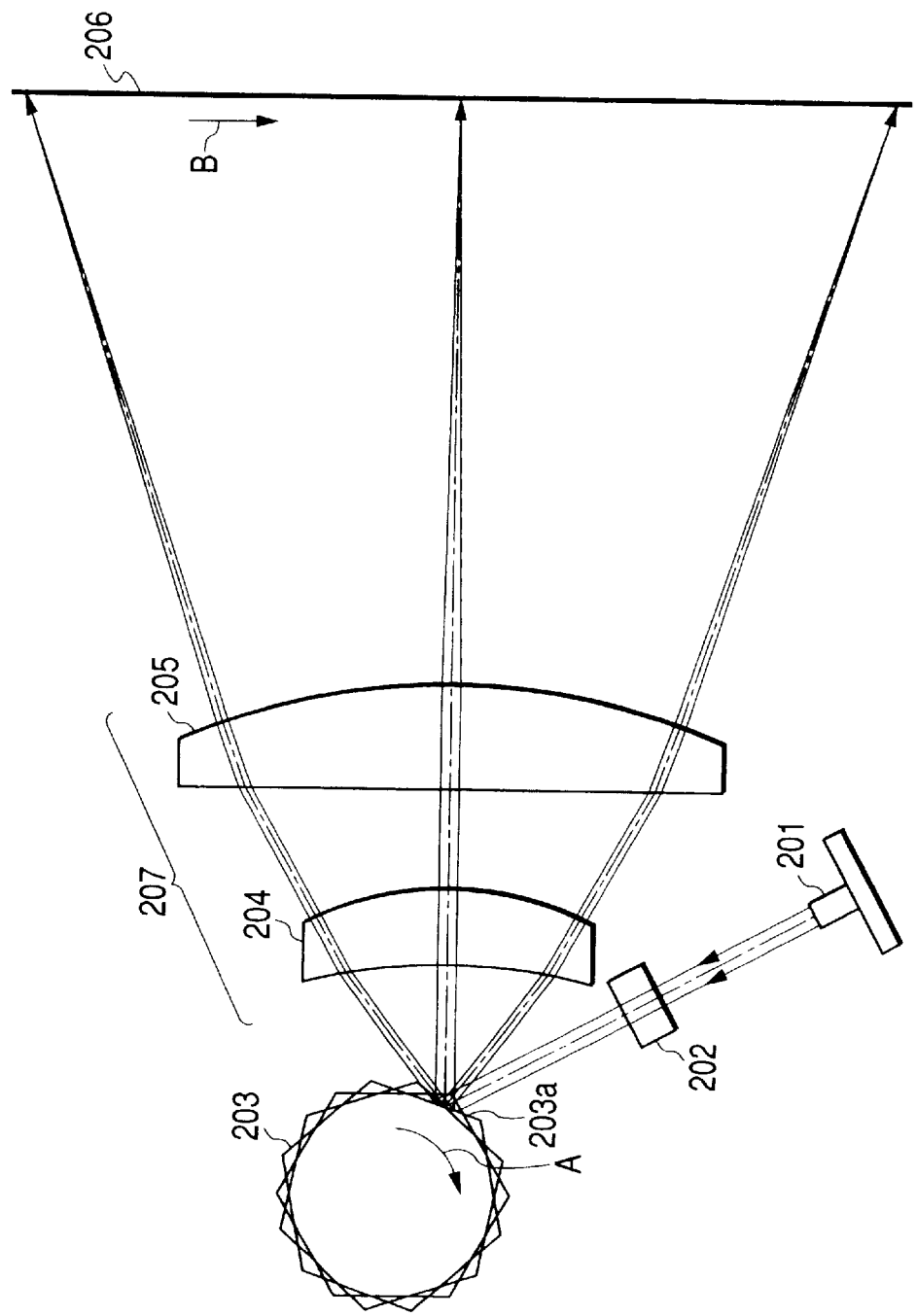
FIG. 20 is a schematic view showing the main part of a conventional optical scanning apparatus.

FIG. 19 is a sectional view showing the sub-scanning-direction main part of an electrophotographic printer as an image forming apparatus using the optical scanning optical system of the present invention. An apparatus 100 comprises one of the above-described optical scanning apparatuses (or multi-beam optical scanning apparatuses) according to the first to third embodiments of the present invention. A photosensitive drum 101 (photosensitive member) serves as an electrostatic latent image carrier. A charging roller 102 for uniformly charging the surface of the photosensitive drum 101 is placed above the photosensitive drum 101 such that the surface of the charging roller 102 is in contact with the photosensitive drum 101. The charged surface of the photosensitive drum 101 downstream in a rotational direction A, which is located on the lower side of the contact position of the charging roller 102, is irradiated with a light beam 103 scanned by the optical scanning apparatus 100.

As described above, the light beam 103 is modulated on the basis of image data. By irradiating the photosensitive surface with the light beam 103, an electrostatic latent image is formed on the surface of the photosensitive drum 101. This electrostatic latent image is developed as a toner image by a developing unit 107 serving as a developing means, which is placed downstream from the irradiation position of the light beam 103 in the rotational direction of the photosensitive drum 101 so as to be in contact with the photosensitive drum 101. The toner image is transferred onto a paper sheet 112 as a transfer medium by a transfer roller 108 serving as a transfer means and placed below the photosensitive drum 101 to oppose the photosensitive drum 101. The paper sheet 112 is stored in a paper cassette 109 in front of the photosensitive drum 101 (on the right side in FIG. 19). However, a paper sheet can also be manually fed. A feed roller 110 is placed at an end portion of the paper cassette 109 to feed the paper sheet 112 in the paper cassette 109 onto a convey path.

The paper sheet 112 on which the unfixed toner image is transferred in the above manner is further conveyed to a fixing unit serving as a fixing means behind (the left side in FIG. 19) the photosensitive drum 101. The fixing unit is made up of a fixing roller 113 incorporating a fixing heater (not shown) and a press roller 114 which is pressed against the fixing roller 113. The fixing unit fixes the unfixed toner image on the paper sheet 112 conveyed from the transfer unit by heating the paper sheet 112 while pressing it between the fixing roller 113 and the pressing portion of the press roller 114. In addition, a paper discharge roller 116 is placed behind the fixing roller 113 to discharge the image-fixed paper sheet 112 outside the printer.

This image forming apparatus receives code data Dc from an external device (not shown) such as a personal computer. This code data Dc is converted into image data (dot data) Di by a printer controller in the apparatus. This image data Di is input to the optical scanning apparatus 100 having an arrangement like the one described in each of the first to fourth embodiments. The light beam 103 modulated in accordance with the image data Di emerges from the optical scanning apparatus 100, and the photosensitive surface of the photosensitive drum 101 is scanned in the main scanning direction with the light beam 103.

Although not shown in FIG. 19, the printer controller (not shown) controls the respective components in the image forming apparatus or a polygon motor in the optical scanning apparatus (to be described later) as well as data conversion described above.

The present invention is especially applied to an image forming apparatus with high resolution of 1,200 dpi or more.

According to the present invention, in an optical scanning apparatus using an oblique incident optical system as described above, an optical scanning apparatus which makes the amount of jitter that occurs due to oblique incidence fall within the allowable range and suppresses jitter that occurs due to a tilt of the deflecting surface of the optical deflector small by appropriately setting the elements such that the amount of jitter that occurs in the main scanning direction due to a tilt of the deflecting surface of the optical deflector falls within the allowable range, thereby obtaining a satisfactory image, and an image forming apparatus using the optical scanning apparatus can be attained.

In addition, according to the present invention, in a multi-beam optical scanning apparatus using an oblique incident optical system as described above, a multi-beam optical scanning apparatus which makes the sum of the amount of jitter that occurs due to oblique incidence and the amount of jitter when a plurality of light sources are used fall within the allowable range and suppresses jitter that occurs due to a tilt of the deflecting surface of the optical deflector small by appropriately setting the elements such that the amount of jitter that occurs in the main scanning direction due to a tilt of the deflecting surface of the optical deflector falls within the allowable range, thereby obtaining a satisfactory image, and an image forming apparatus using the multi-beam optical scanning apparatus can be attained.

What is claimed is:

1. An optical scanning apparatus comprising:
   an incident optical system for causing a light beam emitted from light source means to be obliquely incident in a sub-scanning cross-section on a deflecting surface of an optical deflector having a plurality of deflecting surfaces; and
   an imaging optical system for forming, on a scanned surface, an image of the light beam deflected by the deflecting surface of the optical deflector,
   wherein letting K (dpi) be a recording density in a main scanning direction on the scanned surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section, a condition given by $$\left|\sin\frac{\theta}{2}\times\sin\gamma\left(\cos\alpha\times\sin\gamma\times\cos\phi\times\cos\frac{\theta}{2}+\cos\alpha\times\sin\gamma\times\sin\phi\times\sin\frac{\theta}{2}+\sin\alpha\times\cos\gamma\right)\right|<\frac{6.35}{f\times K}$$

is satisfied.

2. An apparatus according to claim 1, wherein at least some optical elements of said imaging optical system form some elements of said incident optical system.

3. An apparatus according to claim 1, wherein the optical axis is substantially parallel to the scanning central axis when the optical axis of said incident optical system opposing the deflecting surface is projected to the main scanning cross-section.

4. An apparatus according to claim 1, further comprising synchronization detection means, arranged near the scanned surface and including a slit, for controlling a timing at a scanning start position on the scanned surface, the slit having an aperture portion inclined in a sub-scanning direction.

5. An apparatus according to claim 1, wherein the light beam emitted from the light source means becomes incident on the deflecting surface while having a width larger than a main scanning width of the deflecting surface of the optical deflector.

6. An image forming apparatus comprising:
   said optical scanning apparatus of any one of claims 1 to 5;
   a photosensitive member placed on the scanned surface of said optical scanning apparatus;
   developing means for developing an electrostatic latent image formed by scanning said photosensitive member with the light beam as a toner image;
   transfer means for transferring the developed toner image to a paper sheet; and
   fixing means for fixing the transferred toner image on the paper sheet.

7. An image forming apparatus comprising:
   said optical scanning apparatus of any one of claims 1 to 5; and
   a printer controller for converting code data received from an external device into an image signal and inputting the image signal to said optical scanning apparatus.

8. An optical scanning apparatus comprising:
   an incident optical system for causing a light beam emitted from light source means to be obliquely incident in a sub-scanning cross-section on a deflecting surface of an optical deflector having a plurality of deflecting surfaces; and
   an imaging optical system for forming, on a scanned surface, an image of the light beam deflected by the deflecting surface of the optical deflector,
   wherein letting K (dpi) be a recording density in a main scanning direction on the scanned surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section, a condition given by $$\left|\sin\frac{\theta}{2}\times\sin\gamma\left(\cos\alpha\times\sin\gamma\times\cos\phi\times\cos\frac{\theta}{2}+\right.\right.$$

-continued $$\left|\cos\alpha \times \sin\gamma \times \sin\phi \times \sin\frac{\theta}{2} + \sin\alpha \times \cos\gamma\right| < \frac{6.35}{f \times K}$$

is satisfied,
wherein the recording density in the main scanning direction is not less than 1,200 dpi.

9. A multi-beam optical scanning apparatus comprising:
an incident optical system for causing a plurality of light beams emitted from light source means having a plurality of light-emitting units to be obliquely incident in a sub-scanning cross-section on a deflecting surface of an optical deflector having a plurality of deflecting surfaces; and
an imaging optical system for forming, on a photosensitive drum surface, images of the plurality of light beams deflected by the deflecting surface of the optical deflector,
wherein letting K (dpi) be a recording density in a main scanning direction on the photosensitive drum surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section,
R be a radius of the photosensitive drum, and ε1 and ε2 be incident angles of light beams which are separated from each other by the largest distance in the plurality of light beams incident on the photosensitive drum surface, a condition given by $$\left|2\sin\frac{\theta}{2} \times \sin\gamma\left(\cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma\right)\right| + \frac{|R(\cos\varepsilon 1 - \cos\varepsilon 2)\tan\theta|}{f} < \frac{12.7}{f \times K}$$

is satisfied.

10. An apparatus according to claim 9, wherein at least some optical elements of said imaging optical system form some elements of said incident optical system.

11. An apparatus according to claim 10, wherein the optical axis is substantially parallel to the scanning central axis when the optical axis of said incident optical system opposing the deflecting surface is projected to the main scanning cross-section.

12. An apparatus according to claim 9, wherein the optical axis is substantially parallel to the scanning central axis when the optical axis of said incident optical system opposing the deflecting surface is projected to the main scanning cross-section.

13. An apparatus according to claim 9, further comprising synchronization detection means, arranged near the photosensitive drum surface and including a slit, for controlling a timing at a scanning start position on the scanned surface, the slit having an aperture portion inclined in a sub-scanning direction.

14. An apparatus according to claim 9, wherein the plurality of light beams emitted from the light source means become incident on the deflecting surface while having a width larger than a main scanning width of the deflecting surface of the optical deflector.

15. An image forming apparatus comprising:
said multi-beam optical scanning apparatus of any one of claims 9 to 14;
developing means for developing an electrostatic latent image formed by scanning the photosensitive drum surface with the plurality of light beams as a toner image;
transfer means for transferring the developed toner image to a paper sheet; and
fixing means for fixing the transferred toner image on the paper sheet.

16. A multi-beam optical scanning apparatus comprising:
an incident optical system for causing a plurality of light beams emitted from light source means having a plurality of light-emitting units to be obliquely incident in a sub-scanning cross-section on a deflecting surface of an optical deflector having a plurality of deflecting surfaces; and
an imaging optical system for forming, on a photosensitive drum surface, images of the plurality of light beams deflected by the deflecting surface of the optical deflector,
wherein letting K (dpi) be a recording density in a main scanning direction on the photosensitive drum surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section, R be a radius of the photosensitive drum, ε1 and ε2 be incident angles of light beams which are separated from each other by the largest distance in the plurality of light beams incident on the photosensitive drum surface, a condition give by $$\left|2\sin\frac{\theta}{2} \times \sin\gamma\left(\cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma\right)\right| + \frac{|R(\cos\varepsilon 1 - \cos\varepsilon 2)\tan\theta|}{f} < \frac{12.7}{f \times K}$$

is satisfied,
wherein the recording density in the main scanning direction is not less than 1,200 dpi.

17. A multi-beam optical scanning apparatus comprising:
an incident optical system for causing a plurality of light beams emitted from light source means having a plurality of light-emitting units to be obliquely incident in a sub-scanning cross-section on a deflecting surface of an optical deflector having a plurality of deflecting surfaces; and
an imaging optical system for forming, on a photosensitive surface formed from a flat surface, images of the plurality of light beams deflected by the deflecting surface of the optical deflector,
wherein letting K (dpi) be a recording density in a main scanning direction on the photosensitive surface, γ be an absolute value of a maximum difference in a tilt angle between the deflecting surfaces in the sub-scanning cross-section, α be an incident angle of the light beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section, ε3 be incident angles of the plurality of light beams incident on the photosensitive surface, and L be a distance on the photosensitive surface between light beams which are separated from each other by the largest distance in the plurality of light beams incident on the photosensitive surface, a condition given by $$\left|2\sin\frac{\theta}{2} \times \sin\gamma\left(\cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma\right)\right| + \frac{|L\sin\varepsilon 3 \times \tan\theta|}{f} < \frac{12.7}{f \times K}$$

is satisfied.

18. An apparatus according to claim 17, wherein at least some optical elements of said imaging optical system form some elements of said incident optical system.

19. An apparatus according to claim 18, wherein the optical axis is substantially parallel to the scanning central axis when the optical axis of said incident optical system opposing the deflecting surface is projected to the main scanning cross-section.

20. An apparatus according to claim 17, wherein the optical axis is substantially parallel to the scanning central axis when the optical axis of said incident optical system opposing the deflecting surface is projected to the main scanning cross-section.

21. An apparatus according to claim 17, further comprising synchronization detection means, arranged near the scanned surface and including a slit, for controlling a timing at a scanning start position on the scanned surface, the slit having an aperture portion inclined in a sub-scanning direction.

22. An apparatus according to claim 17, wherein the plurality of light beams emitted from the light source means become incident on the deflecting surface while having a width larger than a main scanning width of the deflecting surface of the optical deflector.

23. An image forming apparatus comprising:
said multi-beam optical scanning apparatus of any one of claims 17 to 22;
developing means for developing an electrostatic latent image formed by scanning the photosensitive surface with the plurality of light beams as a toner image;
transfer means for transferring the developed toner image to a paper sheet; and
fixing means for fixing the transferred toner image on the paper sheet.

24. A multi-beam optical scanning apparatus comprising:
an incident optical system for causing a plurality of light beams emitted from light source means having a plurality of light-emitting units to be obliquely incident in a sub-scanning cross-section on a deflecting surface of an optical deflector having a plurality of deflecting surfaces; and
an imaging optical system for forming, on a photosensitive surface formed from a flat surface, images of the plurality of light beams deflected by the deflecting surface of the optical deflector,
wherein letting K (dpi) be a recording density in a main scanning direction on the photosensitive surface, γ be an absolute value of a maximum difference in a tilt angle between the deflecting surfaces in the sub-scanning cross-section, α be an incident angle of the ligh beam incident on the deflecting surface in the sub-scanning cross-section, θ be a scanning angle of an outermost off-axis light beam with respect to an optical axis of said imaging optical system in a main scanning cross-section, f be a focal length of said imaging optical system, and φ be an angle a scanning central axis makes with an optical axis when an optical axis of said incident optical system opposing the deflecting surface is projected to the main scanning cross-section, ε3 be incident angles of the plurality of light beams incident on the photosensitive surface, and L be a distance on the photosensitive surface between light beams which are separated from each other by the largest distance in the plurality of light beams incident on the photosensitive surface, a condition given by $$\left|2\sin\frac{\theta}{2} \times \sin\gamma\left(\cos\alpha \times \sin\gamma \times \cos\phi \times \cos\frac{\theta}{2} + \cos\alpha \times \sin\gamma \times \sin\phi \times \sin\frac{\theta}{2} + \sin\alpha \times \cos\gamma\right)\right| + \frac{|L\sin\varepsilon 3 \times \tan\theta|}{f} < \frac{12.7}{f \times K}$$

is satisfied,
wherein the recording density in the main scanning direction is not less than 1,200 dpi.

25. An image forming apparatus comprising:
said multi-beam optical scanning apparatus of any one of claims 9 to 14, and 17 to 22; and
a printer controller for converting code date received from an external device into an image signal and inputting the image signal to said multi-beam optical scanning apparatus.

* * * * *

UNITED STATES PATENT AND TRADEMARK OFFICE
CERTIFICATE OF CORRECTION

PATENT NO. : 6,519,070 B2
DATED : February 11, 2003
INVENTOR(S) : Hidemi Takayama It is certified that error appears in the above-identified patent and that said Letters Patent is hereby corrected as shown below:

Column 12,
Line 57, "angle e" should read -- angle θ --.

Column 18,
Line 40, "drum," should read -- drum, and --; and
Line 44, "give" should read -- given --.

Column 19,
Line 40, "scanned surface" should read -- photosensitive surface --.

Signed and Sealed this

Twenty-eighth Day of October, 2003

JAMES E. ROGAN
*Director of the United States Patent and Trademark Office*